UNITED STATES PATENT OFFICE.

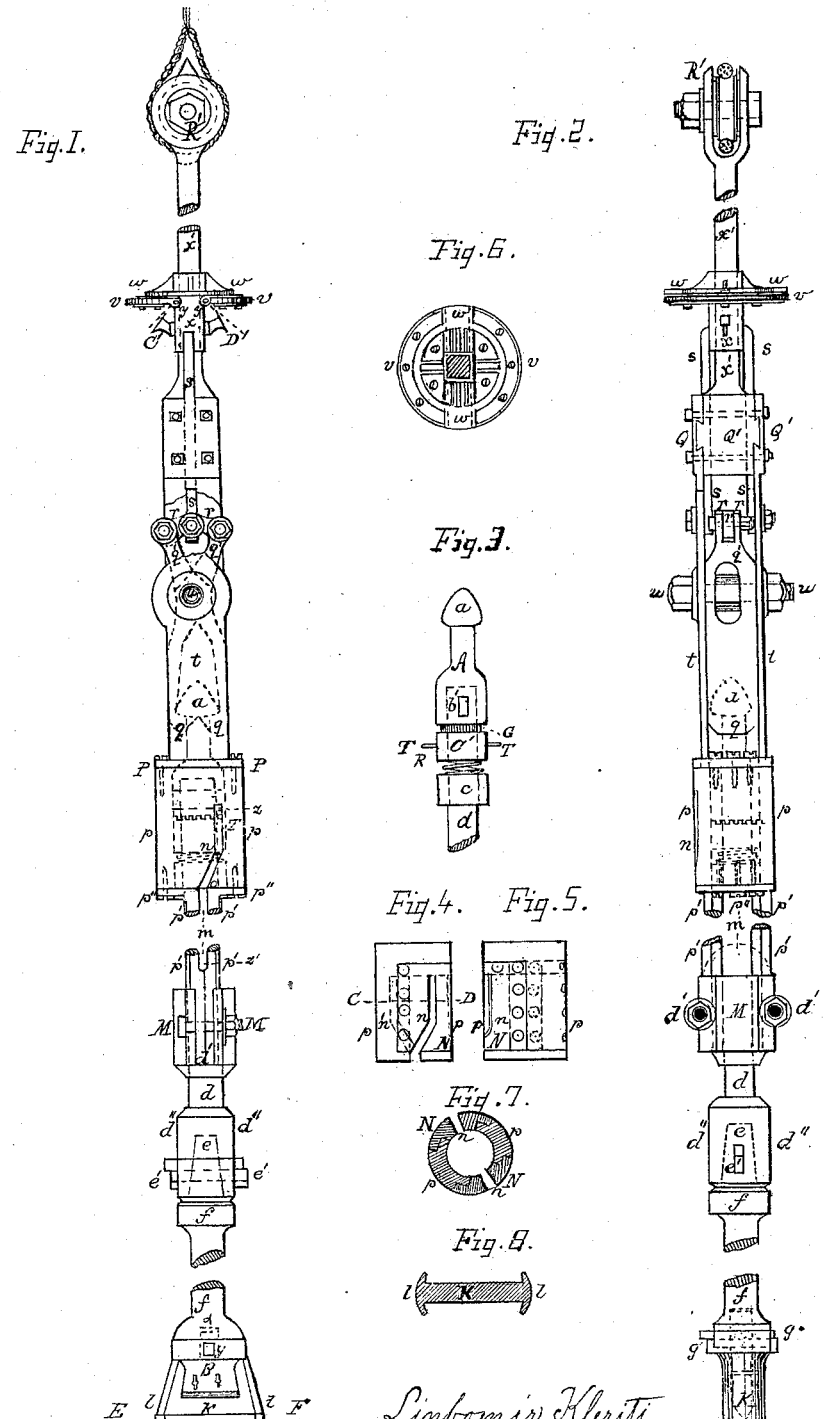

LJNBOMIR KLERITJ, OF BELGRADE, SERVIA.

IMPROVEMENT IN DRILLS FOR BORING WELLS.

Specification forming part of Letters Patent No. 131,548, dated September 24, 1872.

*To all whom it may concern:*

Be it known that I, LJNBOMIR KLERITJ, of Belgrade, in the Principality of Servia, have invented certain Improvements in Gravitating Rope-Bore, of which the following is a specification:

This invention relates to certain improvements in drills for boring Artesian and other wells, and consists, in brief, in securing the gravitating or drilling shaft in a slotted cylinder, and in raising and lowering said shaft through this cylinder by means of griping-jaws, a cap provided with valves, and any ordinary elevating device, as ropes and pulleys &c., an intermittent rotating movement being imparted to the shaft in its passage through said cylinder, all as hereinafter more fully specified.

Figure 1 is a side elevation of my improved gravitating rope bore or drill. Fig. 2 is a front elevation of the same. Figs. 3 to 8 are views of detached parts of my device, which are hereinafter explained.

Letter $d$ represents the shaft. $f$ is the boring-rod, secured in a socket, $d''$, in the end of the shaft $d$ by a tongue, $e$, and wedges $e'$ $e'$, which pass through openings in said socket and tongue. K is the chisel provided with cutting-edges $l$ $l$, as shown in Fig. 8, (which is a cross section thereof on line E F of Fig. 1,) and secured in a socket, B, in rod $f$ by wedges $g$ $g$. M M are plates loosely surrounding the shaft and attached to each other by bolts $d'$ $d'$. $p$ $p$ is a cylinder connected with plates M by rods $p'$ $p'$ $p'$ $p'$, through the lower ends of which the bolts $d'$ pass, thus securing said rods between the plates M. The upper ends of these rods are made with flanges $p''$ $p''$, through which screws are passed into the cylinder. The rods $p'$ are so arranged as to form ways $m$ which serve as continuation of slots $n$ in the cylinder, as shown more particularly in Figs. 4 and 5, which are respectively side and front views of said cylinder. The slots $n$ $n$ are made in plates N N, removably fixed in the cylinder, as shown in Fig. 7—a cross-section of line C D, Fig. 4—the object of which construction appears hereinafter. The upper part of shaft $d$—see Fig. 3, which is a front view thereof— is provided with a ring or collar, $c$, rigidly attached thereto, which fits closely, but is free to move in the cylinder $p$. $c'$ is a second collar or ring loosely fixed on said shaft, with a spring, R, interposed between it and collar $c$. T T are pins or studs on opposite sides of collar $c'$, which work in slots $n$ in the cylinder. A is a head secured on the end of shaft $d$ by a wedge or other device, $b'$, and provided with an arrow-head, $a$. Between cap A and collar $c'$ a rubber spring, G, is interposed, which, by being contracted between said cap and collar extends its edges beyond the collar and fixes said collar firmly against the plates N. The mechanism below the cylinder $p$, including the shaft-head, (from $c$ to $a$, see Fig. 3,) constitutes the lower or boring part of my device. The cylinder forms the end of the operating mechanism of the boring device or lower part.

This operating mechanism I will now proceed to describe: $t$ $t$ are plates or flat bars, forming a frame-work to connect the cylinder with the upper part of the operating mechanism. A box or coupling, Q, is formed by the plates $t$ $t$ and small side blocks Q', which are all bolted together. The lower ends P of the plates form the head of cylinder $p$. $q'$ $q'$ are jaws or levers hung on a bolt, $u$, passing through the bars $t$, and having hooked ends $q$ $q$, which engage with the head $a$ of cap A. $r$ $r$ is a toggle-joint fastened in the end of jaws $q'$, and connected by arms $s$ $s$ with a sleeve $x$, which sleeve has an up-and-down motion on a stem, $x'$ $x'$, bolted in the box or coupling Q. On the sleeve $x$ is secured or formed a cap, (see top view thereof, Fig. 6,) which is composed of a ring or frame, $w$, to the under side of which are hinged, at $y$ $y$, flap-valves $v$ $v$, made of semicircular pieces of leather secured between pieces of metal. C' D' are seats projecting from sleeve $x$, against which the valves rest in the ascent of the drill. R' is a pulley, swiveled on the end of the stem $x'$, around which the elevating-rope passes.

The operation is as follows: The parts having been properly put together, as in Figs. 1 and 2, and the device put in position, say to drill an Artesian well, by drawing it up and releasing it the pressure of water on the cap will cause it and the sleeve, of course, to ascend with reference to the motion of the cylinder. This draws up the rods or arms $s$ $s$, which act upon the toggle-joint to open the jaws and cause them to release the head $a$, when the weight of the boring apparatus will cause it to fall with force upon the rock and cut it. The shaft carrying the boring device will have fallen then from the point 2 in slot $n$ to the point $Z'$ in ways $m$, and by means of proper curves or angles in the slots $n$ any desired screw or rotating or intermittent rotating motion may be given to the chisel so as to bore or drill the rock, this motion being imparted to the chisel by means of the pins T on the collar $c'$ working in slots $n$, the pressure exerted on said collar by springs R and G preventing its turning upon the shaft $d;$ hence giving said shaft the motion imparted by said slots $n$. The slotted plates N, as before stated, are removable, the object being to allow of the use of different forms of slots to give any desired motion to the boring-tool. As soon as the collar $c'$ leaves the slot $n$ the pressure upon the springs R and G is relieved and the collar turns freely on the shaft until said shaft again enters the cylinder, when this pressure is renewed. By the elevation of the operating mechanism the valves fall and allow the water to escape, and the cap is moved up on stem $x'$, whereby the jaws are drawn together and embrace the head $a$, and the whole mechanism can then be raised so as to be ready for a new fall.

What I claim is—

1. The ring $c$, collar $c'$, pins T, cap A, and springs G and R, in combination with the slotted cylinder $p$, substantially as and for the purpose specified.

2. In combination with the collars $c\ c'$, cap A, and springs G R, the jaws $q\ q$ and their operating mechanism, substantially as set forth.

3. The ring $w$, valves $v$, and sleeve $x$, in combination with the arms $s$, toggle-joint $r$, and jaws $q'\ q'$, substantially as described.

4. The rods $p'\ p'$, forming ways $m$, in combination with the cylinder $p$ and plates M, substantially as and for the purposes specified.

5. The combination, with cylinder $p$, of the removable slotted plates N, substantially as and for the purpose specified.

6. The combination, with the shaft $d$, of the ring $c$, spring R, loose ring $c'$ and its pins T, spring G, and cap A, substantially as and for the purposes specified.

7. The combination, with the sleeve $x$, of the ring $w$, flap-valves $v$, and rests or seats $C'\ D'$, substantially as and for the purpose specified.

LJNBOMIR KLERITJ.

Witnesses:
ROBERT GOTTHEIL,
LOUIS BRUEGER.